United States Patent
Hasegawa et al.

(10) Patent No.: US 7,517,478 B2
(45) Date of Patent: Apr. 14, 2009

(54) PROCESS FOR PREPARING POLYVINYL ALCOHOL FILM AND POLARIZING FILM USING THE SAME

(75) Inventors: Kenji Hasegawa, Ogaki (JP); Toshiyuki Edazawa, Ogaki (JP)

(73) Assignee: The Nippon Synthetic Chemical Industry Co. Ltd., Gifu-ken (JP)

(*) Notice: Subject to any disclaimer, the term of this patent is extended or adjusted under 35 U.S.C. 154(b) by 409 days.

(21) Appl. No.: 10/731,524

(22) Filed: Dec. 9, 2003

(65) Prior Publication Data
US 2004/0113307 A1     Jun. 17, 2004

(51) Int. Cl.
*B29D 11/00*     (2006.01)
(52) U.S. Cl. .................. 264/1.34; 264/1.6; 264/185; 264/216
(58) Field of Classification Search .................. 264/1.1, 264/1.34, 185, 216, 211.12, 1.31, 1.6; 359/490
See application file for complete search history.

(56) References Cited

U.S. PATENT DOCUMENTS 3,060,515 A * 10/1962 Corbett ...................... 264/284
4,893,148 A * 1/1990 Sanada et al. ................. 355/27
6,337,369 B1 * 1/2002 Isozaki ........................ 525/61
2001/0024322 A1  9/2001 Harita et al. ................. 359/490
2001/0039319 A1  11/2001 Harita et al. ................. 526/319
2002/0001700 A1  1/2002 Sanefuji et al. ............. 428/220
2003/0089808 A1 * 5/2003 Takeuchi et al. .......... 242/160.4

FOREIGN PATENT DOCUMENTS

| JP | 62-101421 | * | 5/1987 |
| JP | 310346/1993 | | 11/1993 |
| JP | 337967/1993 | | 12/1993 |
| JP | 10-138405 | * | 5/1998 |
| JP | P3075431 | * | 6/2000 |

* cited by examiner

*Primary Examiner*—Mathieu D. Vargot

(57) ABSTRACT

A process for preparing an optically homogeneous polyvinyl alcohol film having an excellent appearance without forming wrinkles and scratches and causing blocking of the film, the process comprising the steps of forming a polyvinyl alcohol film from a solution of a polyvinyl alcohol resin, and rolling up the film around a cylindrical core, wherein the surface hardness of the rolled up film is set to a Shore A hardness of 60 to 95 measured according to JIS K 6301 under conditions of 25° C. and 55% RH.

3 Claims, 2 Drawing Sheets

α

PROCESS FOR PREPARING POLYVINYL ALCOHOL FILM AND POLARIZING FILM USING THE SAME

BACKGROUND OF THE INVENTION

The present invention relates to a process for preparing a polyvinyl alcohol film having an excellent appearance and a polarizing film having an excellent polarizing property obtained by using the polyvinyl alcohol film.

Polyvinyl alcohol films have been generally prepared by dissolving a polyvinyl alcohol resin in a solvent, deaerating the resulting solution, forming it into a film by a solution casting method and drying the film by using a metallic heating roll and the like. The film which has passed through the above drying step is then dried by a drier to evaporate the moisture contained in the film, provided again with a predetermined amount of moisture in a humidity conditioner and rolled up around a cylindrical core tube to give a rolled up film to be put on the market. The thus rolled up polyvinyl alcohol films have been utilized for many applications as a film having an excellent shape stability. One of the useful applications is an optical film, particularly a polarizing film.

If winding of a film around a cylindrical core is too slack or too tight, a problem arises in appearance of the film such that wrinkles generate or the film scratches, or a problem arises that the wound film causes blocking. If a polarizing film is produced from a film that has once caused such a problem, the polarizing property is of course deteriorated.

It is an object of the present invention to provide a process for preparing a polyvinyl alcohol film according to which generation of wrinkles and scratches and blocking of a film are prevented, thus providing an optically homogeneous polyvinyl alcohol film having an excellent appearance.

Another object of the present invention is to provide a polarizing film having an excellent polarizing property.

These and other objects of the present invention will become apparent from the description hereinafter.

SUMMARY OF THE INVENTION

In order to prevent a polyvinyl alcohol film from forming wrinkles and scratches in the step of rolling up the film around a cylindrical core and to prevent the rolled up film from causing blocking to thereby obtain a polyvinyl alcohol film having an excellent appearance, investigation was made with respect to properties of the film roll. Thus, it has been found that the appearance failure owing to the above-mentioned causes such as wrinkling is closely connected with the surface hardness of the film roll (hardness of the surface of rolled up film). After further investigation with respect to a proper surface hardness of the film roll, it has now been found that when a polyvinyl alcohol film is rolled up around a cylindrical core so as to give a film roll having a surface hardness of 60 to 95 in terms of Shore A hardness measured according to JIS K 6301 under conditions of 25° C. and 55% RH, a polyvinyl alcohol film having an excellent appearance is obtained without generating wrinkles and scratches and without causing blocking of the film.

In accordance with the present invention, there is provided a process for preparing a polyvinyl alcohol film comprising the steps of forming a polyvinyl alcohol film from a solution of a polyvinyl alcohol resin, and rolling up the film around a cylindrical core, wherein the surface hardness of a film roll obtained after passing through the rolling up step is set to a Shore A hardness of 60 to 95 measured according to JIS K 6301 under conditions of 25° C. and 55% RH.

The present invention also provide a polarizing film prepared from a polyvinyl alcohol film prepared by the above-mentioned process of the present invention.

DETAILED DESCRIPTION

Figure 1:
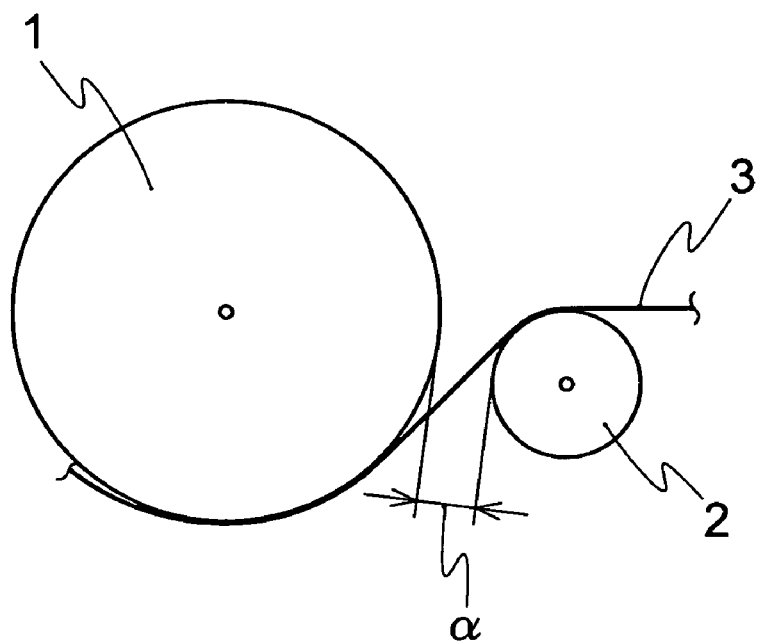
FIG. 1 is a schematic view for illustrating an embodiment of a process for preparing a polyvinyl alcohol film according to the present invention.

In the process of the present invention, polyvinyl alcohol resins are used as a material for forming a film. The polyvinyl alcohol resins are usually prepared by polymerizing vinyl acetate and hydrolyzing the polyvinyl acetate. The polyvinyl alcohol resins used in the present invention are not limited to hydrolysis products of polyvinyl acetate, and may contain a small amount, e.g., 0 to 15% by mole, especially 0 to 5% by mole, of other components copolymerizable with vinyl acetate, e.g., an unsaturated carboxylic acid (including its salt, ester, amide and nitrile), an olefin having 2 to 30 carbon atoms such as ethylene, propylene, n-butene or isobutene, a vinyl ether, an unsaturated sulfonic acid salt, and the like. The polyvinyl alcohol resins may be those containing a silyl group. The silyl group-containing resins can be prepared, for example, by post modification using a silylating agent, or copolymerization of vinyl acetate with an olefinically unsaturated monomer containing a silyl group followed by hydrolysis, according to a known method. Examples of the silyl group-containing olefinically unsaturated monomer are, for instance, vinylsilane, (meth)acrylamide alkylsilane, and the like.

The degree of polymerization of the polyvinyl alcohol resins is not particularly limited, but it is preferably from 1,000 to 7,000, more preferably 1,200 to 6,000, further more preferably 1,400 to 5,000. If the degree of polymerization is less than 1,000, sufficient polarizing property is not obtained when films of the polyvinyl alcohol resins are used for the production of polarizing films. If the degree of polymerization is more than 7,000, industrial production of polarizing films tends to become difficult since stretching of the films is difficult.

The degree of hydrolysis of the polyvinyl alcohol resins is preferably not less than 80% by mole, more preferably from 85 to 100% by mole, further more preferably from 98 to 100% by mole. If the degree of hydrolysis is less than 80% by mole, sufficient polarizing property is hard to be obtained when films of the polyvinyl alcohol resins are used for the production of polarizing films.

The polyvinyl alcohol resins may be incorporated, as occasion demands, with a conventionally used plasticizer such as glycerol, diglycerol, triglycerol, ethylene glycol, triethylene glycol or polyethylene glycol in an amount of at most 30% by weight, preferably at most 25% by weight, more preferably at most 20% by weight, based on the polyvinyl alcohol resin. If the amount of the plasticizer is more than 30% by weight, the film strength tends to deteriorate.

Preferably, the polyvinyl alcohol resins are incorporated with non-ionic, anionic or cationic surface active agents, especially surface active agents having a releasing action such as polyoxyethylene alkylamine, in an amount of at most 5% by weight, preferably from 0.001 to 3% by weight, more preferably from 0.001 to 2% by weight, based on the polyvinyl alcohol resin. If the amount of the surface active agent is more than 5% by weight, the appearance of the surface of films tends to deteriorate.

In the present invention, a polyvinyl alcohol resin is dissolved in a solvent, and polyvinyl alcohol resin films are prepared using the obtained solution.

After preparing a solution of a polyvinyl alcohol resin by dissolving the resin in water or an organic solvent, the solution is formed into a film to give a raw film web.

Examples of the solvent used for the preparation of polyvinyl alcohol resin solution are, for instance, water, dimethyl sulfoxide (DMSO), N-methylpyrrolidone, a polyhydric alcohol such as glycerol, ethylene glycol, propylene glycol, diethylene glycol, triethylene glycol, tetraethylene glycol or trimethylolpropane, an amine compound such as ethylenediamine or diethylenetriamine, and mixtures of these solvents.

The organic solvents as mentioned above may contain a small amount, e.g., 5 to 30% by weight, of water.

The concentration of the polyvinyl alcohol resin in the polyvinyl alcohol resin solution is from 5 to 70% by weight from a practical viewpoint.

The film formation from the polyvinyl alcohol resin solution can be carried out by known methods such as casting and extrusion. The film forming method may be a wet method wherein the solution is discharged through a slit once into air or an inert gas atmosphere such as nitrogen, helium or argon and then led into a coagulating bath to form a non-stretched film, or a dry method wherein the solution is discharged through a slit onto a support such as a roller or a belt conveyer to form a film and is dried to give a non-stretched film.

The thus formed non-stretched film may be further subjected to drying treatment, heat treatment and humidity conditioning treatment, as occasion demands.

It is preferable that the thus obtained non-stretched polyvinyl alcohol film which is then fed to a rolling up step, has a water content of 0.5 to 7% by weight, especially 0.5 to 6% by weight, since problems resulting from blocking and the like, especially breaking of film at the time of rolling up at a high speed, and cracking of edge portions of film at the time of slitting the film are hard to occur if the water content of the film is within the above range.

The polyvinyl alcohol film may be cut into ribbons having a predetermined width by a slitter, as occasion demands, and is subsequently rolled up around a cylindrical core to give a film roll which is provided to a market. The rolling up of the polyvinyl alcohol film around a cylindrical core is carried out by temporarily fastening the top of the film onto the surface of the core with a tape and rotating the core at a predetermined rolling up speed.

In the present invention, the type of the cylindrical core is not particularly limited, and there can be used any of those made of various metal materials such as aluminum, plastic materials such as vinyl chloride resins, paper materials and the like.

It is necessary that the surface hardness of the polyvinyl alcohol film in the state of being rolled up around a cylindrical core, namely the surface hardness of a film roll, is from 60 to 95, preferably from 70 to 90, in terms of Shore A hardness measured according to JIS K 6301 under conditions of 25° C. and 55% RH. If the Shore A hardness of a film roll at its surface is less than 60, the winding is too loose, so the roll is deformed into an elliptical shape, or dent or unevenness generates when handling the roll, thus resulting in deterioration of the quality. If the Shore A hardness is more than 95, the winding is too tight, so there is a possibility of causing deformation of material (permanent deformation), and winding tightness induces generation of wrinkles. In the present invention, the surface hardness of a film roll is obtained by measuring the Shore hardness at three points (center point and points near both edges) of the roll surface at 25° C. and 55% RH by a hardness meter according to JIS K 6301, and averaging the three determinations.

Figure 2:
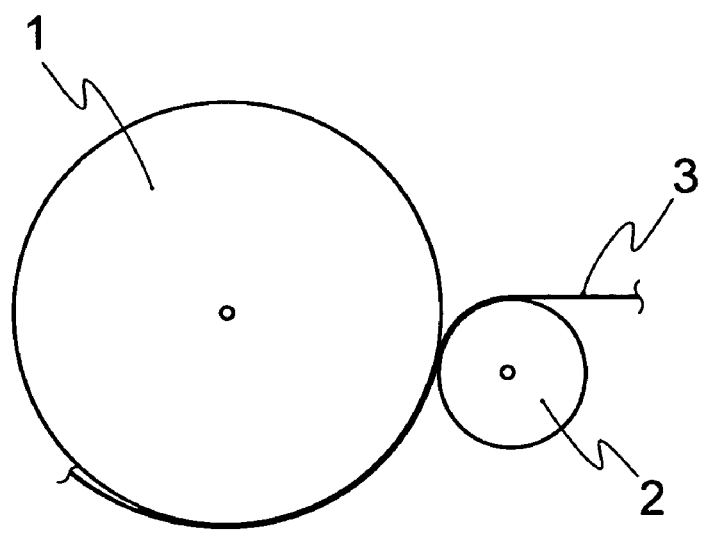
FIG. 2 is a schematic view for illustrating another embodiment of a process for preparing a polyvinyl alcohol film according to the present invention.

In the step of winding up a polyvinyl alcohol film around a cylindrical core, for obtaining a wound film roll having such a surface hardness it is suitable, for example, to dispose a guide roll 2 in parallel with a winding roll to which the cylindrical core is attached, as shown in FIGS. 1 and 2. In this case, the film is wound around cylindrical core tube 1 with maintaining the space ($\alpha$) between the cylindrical core tube 1 and guide roll 2, namely in a non-contacting state that the guide roll 2 does not come into contact with the film roll (this manner of winding being hereinafter referred to as "near winding"), as shown in FIG. 1. Alternatively, the film is wound around cylindrical core tube 1 in the state that guide roll 2 is in contact with cylindrical core tube 1 (and film roll during winding) through polyvinyl alcohol film 3 (this manner of winding being hereinafter referred to as "touch winding"). A film roll having a desired surface hardness can be obtained by carrying out the winding in such manners.

Figure 3:
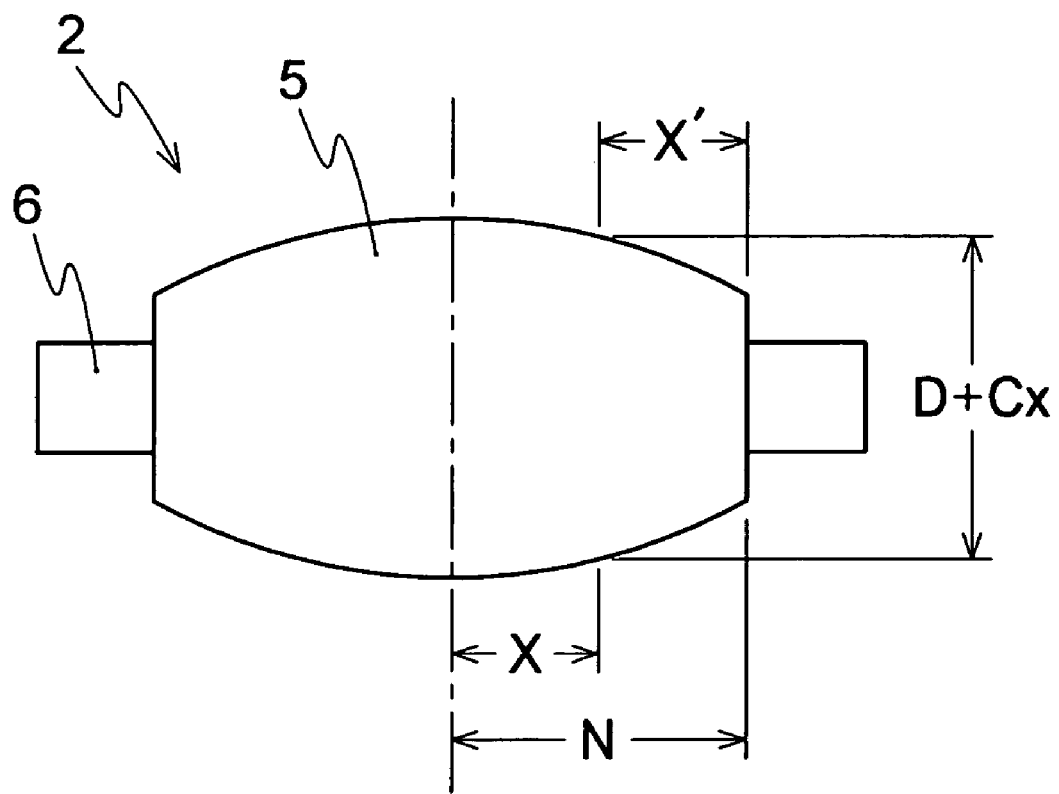
FIG. 3 is a plan view showing the shape of a crown roll which is an example of guide rolls used in practicing the process of the present invention.

As a guide roll 2 is used, for example, a roll having a structure as shown in FIG. 3 wherein an elastomer layer 5 is formed on the periphery of an axis 6. With respect to the shape of the roll, it is preferable to use a crown roll which has s shape such that the diameter of the elastomer layer 5 of the guide roll 2 gradually decreases from the center toward the both ends with the periphery of the elastomer layer 5 drawing a curve. Even if wrinkles are formed when winding up a film around a winding roll, the wrinkles get away toward the both ends of the winding roll by using a guide roll having such a shape, so the formation of wrinkles is effectively prevented.

The material for forming the guide roll 2 is not particularly limited, and any of elastomers known as a material for forming elastomer layer 5 can be used. Examples thereof are, for instance, isoprene rubber, chloroprene rubber, butadiene rubber, ethylene-propylene rubber, silicone rubber, fluororubber, acrylonitrile-butadiene rubber (NBR), and the like.

It is preferable that the elastomer layer 5 of the guide roll 2 has a JIS A hardness of 30 to 90°.

In the case of using a crown roll as a guide roll 2, it is preferable, for example, that the diameter of the center portion is from 50 to 200 mm and the crown amount (difference between the diameter of the center of the roll and the diameter of the both ends) is from 0.1 to 10 mm.

The crown curve (degree of the curve from the center to the end) of the crown roll is calculated, for example, by the following biquadratic curve equation (a), quadratic curve equation (b) or sine curve (c), and the equation for the calculation is suitably selected. Refer to FIG. 3 with respect to the numerals shown in the following equations (a) to (c). In FIG. 3, D is the diameter (center value) of the crown roll.

$$Cx = C\left[1 + \frac{1}{5}\left(\frac{X}{N}\right)^4 - \frac{6}{5}\left(\frac{X}{N}\right)^2\right] \quad (a)$$

wherein C is an assigned crown value, Cx is a crown value at point x, X is a measured position, and N is the number of divisions.

$$Cx = C\left[1 - \left(\frac{X}{N}\right)^2\right] \quad (b)$$

wherein Cx, C, X and N are as defined above, $$Cx = C \cdot \sin\left(\frac{\pi}{2} \times \frac{X'}{N}\right) \quad (c)$$

wherein Cx, C and N are as defined above, and X' is a measured position.

Besides a crown roll as mentioned above, a spring roll and others can be used as a guide roll 2.

The thus obtained roll of a polyvinyl alcohol film has an excellent appearance and is suitable for use in the preparation of polarizing films. A process for preparing polarizing films from the thus obtained polyvinyl alcohol film will be explained below.

As a process for preparing polarizing films are applicable known processes, e.g., a process wherein the obtained polyvinyl alcohol film is stretched (oriented) and is then dyed by immersing the film in a solution of iodine or a dichromatic dye, followed by treatment with a boron compound; a process wherein the stretching and the dyeing are simultaneously conducted and is then treated with a boron compound; a process wherein the film is dyed with iodine or a dichromatic dye and is stretched, and is then treated with a boron compound; and a process wherein after dyeing the film, the dyed film is stretched in a solution of a boron compound. The process for preparing polarizing films from the polyvinyl alcohol film of the present invention can be suitably selected from these processes.

The thickness of the polyvinyl alcohol film used in the preparation of polarizing films is preferably from 20 to 100 μm, more preferably from 30 to 90 μm. If the film thickness is less than 20 μm, stretching is difficult, and if the film thickness is more than 100 μm, the accuracy in film thickness lowers.

The polyvinyl alcohol film (non-stretched film) is subjected to stretching, dyeing and boron compound treatment, as mentioned above. The stretching, dyeing and boron compound treatment may be conducted in separate steps or simultaneously. In the present invention, it is preferable to conduct a uniaxial stretching (uniaxial orientation) during performing either or both of the dyeing step and the boron compound treating step.

It is preferable to uniaxially stretch the film 3 to 10 times, especially 3.5 to 6 times. At the time of the uniaxial stretching, the film may also be stretched in the perpendicular direction to the uniaxial stretching in a slight amount (to the extent of preventing a shrinkage in the cross direction or more). The stretching temperature is preferably from 40 to 170° C. It is sufficient to finally achieve the above-mentioned stretching ratio and, therefore, the stretching operation may be carried out in a single stage or may be carried out in arbitrary stages in the preparation steps.

The dyeing of the polyvinyl alcohol film is carried out by bringing a liquid containing iodine or a dichromatic dye into contact with the film. Usually, an aqueous solution of iodine-potassium iodide is used. It is preferable that the concentration of iodine is from 0.1 to 2 g/liter, the concentration of potassium iodide is from 10 to 50 g/liter, and the mixing ratio of iodine/potassium iodide is from 20 to 100 by weight. It is practical that the dyeing time is about 30 to about 500 seconds, and it is preferable that the temperature of dyeing bath is from 5 to 50° C. Water is used as a solvent, but the solvent may contain a small amount of an organic solvent miscible with water. Any of known means such as dipping, coating and spraying are applicable for bringing the dye solution into contact with the film.

The dyed polyvinyl alcohol film may be then treated with a boron compound. It is practical to use boric acid or borax as a boron compound. The boron compound is used in the form of a solution in water or a mixed solvent of water and an organic solvent and in a concentration of about 0.5 to about 2 moles/liter. From a practical point of view, it is preferable to incorporate a small amount of potassium iodide in the solution. The treatment with a boron compound is preferably carried out by a dipping method, but the coating method and the spraying method are of course applicable. The treatment is carried out at a temperature of about 50 to about 70° C. for about 5 to about 20 minutes. The stretching operation may be conducted during the boron compound treatment, if desired.

The thus obtained polarizing film can be provided on its either or both surfaces with an optically isotropic polymer film or sheet as a protective film by lamination. Examples of the protective film are, for instance, films or sheets of cellulose triacetate, cellulose diacetate, polycarbonate, polymethyl methacrylate, polystyrene, polyethersulfone, polyarylate, poly-4-methylpentene, polyphenylene oxide and the like.

For the purpose of making the polarizing film thin, a curable polymer such as urethane resin, acrylic resin or urea resin can be coated on either or both surfaces of the polarizing film to form a protective layer instead of laminating the protective film.

The polarizing film (or the polarizing film provided with a protective film or a coating layer on at least one surface thereof) may be further provided on its one surface with a transparent pressure-sensitive adhesive layer by a usual method. Pressure-sensitive adhesives comprising as a main component a copolymer of an acrylic ester such as butyl acrylate, ethyl acrylate, methyl acrylate or 2-ethylhexyl acrylate, an α-monoolefinic carboxylic acid such as acrylic acid, maleic acid, itaconic acid, methacrylic acid or crotonic acid, and optionally a vinyl monomer such as acrylonitrile, vinyl acetate or styrene are particularly preferred since the polarizing property of the polarizing film is not impaired. However, the pressure-sensitive adhesives are not limited thereto, and any of known transparent pressure-sensitive adhesives can be used in the present invention, e.g., polyvinyl ether-based adhesives and rubber-based adhesives.

The thus prepared polarizing films are used, for example, in liquid crystal display devices for digital desk calculator, digital watch, word processor, personal computer, pocket information terminals and gages of automobiles and machines, sunglasses, safety goggles, stereo glasses, reflection-reducing layer for display such as CRT or LCD, medical equipment, building materials, toy, and the like.

The present invention is more specifically explained and described by means of the following Examples and Comparative Examples, wherein all % are by weight unless otherwise noted.

EXAMPLE 1

An aqueous solution of polyvinyl alcohol resin having a solid concentration of 45% (including plasticizer and releasing agent as solid matters) was prepared using a polyvinyl alcohol resin having an average degree of polymerization of 1,700 and a degree of hydrolysis of 99.7% by mole, glycerol as a plasticizer and polyoxyethylene alkylamine as a surfactant (releasing agent). The solution was cast from a T-die onto a dram roll in the form of a thin film and dried, followed by heat-treatment and humidity-conditioning, to give a polyvinyl alcohol film having a water content of 4%.

The polyvinyl alcohol film was subsequently wound up around a cylindrical core tube 1 in parallel with which a guide roll 2 was installed, as shown in FIG. 1, under the following conditions (1,000 m winding). The winding of the polyvinyl alcohol film 3 was conducted in the non-contacting state that the space between the cylindrical core tube 1 and the guide roll 2 was maintained during the operation (near winding).

Cylindrical Core Tube
Material: aluminum
Diameter (outer diameter): 165 mm
Length of cylinder: 2.7 m Guide Roll
Material: acrylonitrile-butadiene rubber (NBR)
Diameter at the center: 150 mm
Diameter at the ends: 149 mm
Crown curve: biquadratic curve equation (a); assigned crown value C=1
Hardness of guide roll (crown roll): 60

Winding Conditions
Space α between core tube and guide roll (distance of space): 15 mm
Winding tension: 100 N/m
Winding speed: 80 m/minute The hardness of a film roll obtained by winding up 1,000 m of the polyvinyl alcohol film was measured by a hardness meter (JIS HARDNESS TESTER made by Shimadzu Corporation) under conditions of 25° C. and 55% RH according to JIS K 6301. The film roll had a Shore A hardness of 73.

The roll of the polyvinyl alcohol film was then unwound at a rate of 1.23 m/minute. After swelling the film in a water bath for washing at 24° C., the film was uniaxially stretched 1.8 times in an iodine bath (20° C., iodine 0.17 g/liter) and 1.7 times in a boric acid bath (50° C., iodine 12 ppm, boric acid 47 g/liter), and further uniaxially stretched 4.6 times in total at a winding speed of 5.6 m/minute to give a polarizing film.

EXAMPLE 2

A polyvinyl alcohol film having a water content of 4% was prepared in the same manner as in Example 1.

The polyvinyl alcohol film was subsequently wound up around a cylindrical core tube 1 in parallel with which a guide roll 2 was installed, as shown in FIG. 1, under the following conditions (1,000 m winding). The winding of the polyvinyl alcohol film 3 was conducted in the non-contacting state that the space between the cylindrical core tube 1 and the guide roll 2 was maintained during the operation (near winding).

Cylindrical Core Tube
Material: aluminum
Diameter (outer diameter): 165 mm
Length of cylinder: 2.7 m Guide Roll
Material: acrylonitrile-butadiene rubber (NBR)
Diameter at the center: 150 mm
Diameter at the ends: 149 mm
Crown curve: biquadratic curve equation (a); assigned crown value C=1
Hardness of guide roll (crown roll): 60

Winding Conditions
Space a between core tube and guide roll (distance of space): 15 mm
Winding tension: 120 N/m
Winding speed: 80 m/minute The hardness of a film roll obtained by winding up 1,000 m of the polyvinyl alcohol film was measured under conditions of 25° C. and 55% RH according to JIS K 6301 in the same manner as in Example 1. The film roll had a Shore A hardness of 85.

The roll of the polyvinyl alcohol film was unwound, treated and uniaxially stretched 4.6 times in total in the same manner as in Example 1 to give a polarizing film.

EXAMPLE 3

A polyvinyl alcohol film having a water content of 4% was prepared in the same manner as in Example 1.

The polyvinyl alcohol film was subsequently wound up around a cylindrical core tube 1 in parallel with which a guide roll 2 was installed, as shown in FIG. 1, under the following conditions (1,000 m winding). The winding of the polyvinyl alcohol film 3 was conducted in the non-contacting state that the space between the cylindrical core tube 1 and the guide roll 2 was maintained during the operation (near winding).

Cylindrical Core Tube
Material: aluminum
Diameter (outer diameter): 165 mm
Length of cylinder: 2.7 m Guide Roll
Material: acrylonitrile-butadiene rubber (NBR)
Diameter at the center: 150 mm
Diameter at the ends: 149 mm
Crown curve: biquadratic curve equation (a); assigned crown value C=1
Hardness of guide roll (crown roll): 60

Winding Conditions
Space a between core tube and guide roll (distance of space): 15 mm
Winding tension: 140 N/rm
Winding speed: 80 m/minute The hardness of a film roll obtained by winding up 1,000 m of the polyvinyl alcohol film was measured under conditions of 25° C. and 55% RH according to JIS K 6301 in the same manner as in Example 1. The film roll had a Shore A hardness of 92.

The roll of the polyvinyl alcohol film was unwound, treated and uniaxially stretched 4.6 times in total in the same manner as in Example 1 to give a polarizing film.

EXAMPLE 4

A polyvinyl alcohol film having a water content of 4% was prepared in the same manner as in Example 1.

The polyvinyl alcohol film was subsequently wound up around a cylindrical core tube 1 in parallel with which a guide roll 2 was installed, as shown in FIG. 2, under the following conditions (1,000 m winding). The winding was conducted in the state that the guide roll 2 was in contact with the cylindrical core tube 1 through the polyvinyl alcohol film 3 (touch winding).

Cylindrical Core Tube
Material: aluminum
Diameter (outer diameter): 165 mm
Length of cylinder: 2.7 m Guide Roll
Material: acrylonitrile-butadiene rubber (NBR)
Diameter at the center: 150 mm
Diameter at the ends: 149 mm
Crown curve: biquadratic curve equation (a); assigned crown value C=1
Hardness of guide roll (crown roll): 60

Winding Conditions
Contact pressure of guide roll: 100 N/m
Winding tension: 100 N/rm
Winding speed: 80 m/minute The hardness of a film roll obtained by winding up 1,000 m of the polyvinyl alcohol film was measured under conditions of 25° C. and 55% RH according to JIS K 6301 in the same manner as in Example 1. The film roll had a Shore A hardness of 73.

The roll of the polyvinyl alcohol film was unwound, treated and uniaxially stretched 4.6 times in total in the same manner as in Example 1 to give a polarizing film.

EXAMPLE 5

A polyvinyl alcohol film having a water content of 4% was prepared in the same manner as in Example 1.

The polyvinyl alcohol film was subsequently wound up around a cylindrical core tube 1 in parallel with which a guide roll 2 was installed, as shown in FIG. 2, under the following conditions (1,000 m winding). The winding was conducted in the state that the guide roll 2 was in contact with the cylindrical core tube 1 through the polyvinyl alcohol film 3 (touch winding).

Cylindrical Core Tube
Material: aluminum
Diameter (outer diameter): 165 mm
Length of cylinder: 2.7 m Guide Roll
Material: acrylonitrile-butadiene rubber (NBR)
Diameter at the center: 150 mm
Diameter at the ends: 149 mm
Crown curve: biquadratic curve equation (a); assigned crown value C=1
Hardness of guide roll (crown roll): 60

Winding Conditions
Contact pressure of guide roll: 150 N/m
Winding tension: 120 N/rm
Winding speed: 80 m/minute The hardness of a film roll obtained by winding up 1,000 m of the polyvinyl alcohol film was measured under conditions of 25° C. and 55% RH according to JIS K 6301 in the same manner as in Example 1. The film roll had a Shore A hardness of 92.

The roll of the polyvinyl alcohol film was unwound, treated and uniaxially stretched 4.6 times in total in the same manner as in Example 1 to give a polarizing film.

COMPARATIVE EXAMPLE 1

A polyvinyl alcohol film having a water content of 4% was prepared in the same manner as in Example 1.

The polyvinyl alcohol film was subsequently wound up around a cylindrical core tube 1 in parallel with which a guide roll 2 was installed, as shown in FIG. 1, under the following conditions (1,000 m winding). The winding of the polyvinyl alcohol film 3 was conducted in the non-contacting state that the space between the cylindrical core tube 1 and the guide roll 2 was maintained during the operation (near winding).

Cylindrical Core Tube
Material: aluminum
Diameter (outer diameter): 165 mm
Length of cylinder: 2.7 m Guide Roll
Material: acrylonitrile-butadiene rubber (NBR)
Diameter at the center: 150 mm
Diameter at the ends: 149 mm
Crown curve: biquadratic curve equation (a); assigned crown value C=1
Hardness of guide roll (crown roll): 60

Winding Conditions
Space α between core tube and guide roll (distance of space): 5 mm
Winding tension: 160 N/m
Winding speed: 80 m/minute The hardness of a film roll obtained by winding up 1,000 m of the polyvinyl alcohol film was measured under conditions of 25° C. and 55% RH according to JIS K 6301 in the same manner as in Example 1. The film roll had a Shore A hardness of 98.

The roll of the polyvinyl alcohol film was unwound, treated and uniaxially stretched 4.6 times in total in the same manner as in Example 1 to give a polarizing film. The obtained polarizing film was not good, since wrinkles generated by tight winding and accordingly uniform dyeing and stretching could not be achieved.

COMPARATIVE EXAMPLE 2

A polyvinyl alcohol film having a water content of 4% was prepared in the same manner as in Example 1.

The polyvinyl alcohol film was subsequently wound up around a cylindrical core tube 1 in parallel with which a guide roll 2 was installed, as shown in FIG. 1, under the following conditions (1,000 m winding). The winding of the polyvinyl alcohol film 3 was conducted in the non-contacting state that the space between the cylindrical core tube 1 and the guide roll 2 was maintained during the operation (near winding).

Cylindrical Core Tube
Material: aluminum
Diameter (outer diameter): 165 mm
Length of cylinder: 2.7 m Guide Roll
Material: acrylonitrile-butadiene rubber (NBR)
Diameter at the center: 150 mm
Diameter at the ends: 149 mm
Crown curve: biquadratic curve equation (a); assigned crown value C=1
Hardness of guide roll (crown roll): 25

Winding Conditions
Space α between core tube and guide roll (distance of space): 25 mm
Winding tension: 60 N/m
Winding speed: 80 m/minute The hardness of a film roll obtained by winding up 1,000 m of the polyvinyl alcohol film was measured under conditions of 25° C. and 55% RH according to JIS K 6301 in the same manner as in Example 1. The film roll had a Shore A hardness of 55.

The roll of the polyvinyl alcohol film was unwound, treated and uniaxially stretched 4.6 times in total in the same manner as in Example 1 to give a polarizing film. However, the roll deformed into an elliptical shape and stable unwinding could not be conducted, thus generating wrinkles, so uniform dyeing and stretching could not be conducted. The obtained polarizing film was not good.

COMPARATIVE EXAMPLE 3

A polyvinyl alcohol film having a water content of 4% was prepared in the same manner as in Example 1.

The polyvinyl alcohol film was subsequently wound up around a cylindrical core tube 1 in parallel with which a guide roll 2 was installed, as shown in FIG. 2, under the following conditions (1,000 m winding). The winding was conducted in the state that the guide roll 2 was in contact with the cylindrical core tube 1 through the polyvinyl alcohol film 3 (touch winding).

Cylindrical Core Tube
Material: aluminum
Diameter (outer diameter): 165 mm
Length of cylinder: 2.7 m Guide Roll
Material: acrylonitrile-butadiene rubber (NBR)
Diameter at the center: 150 mm
Diameter at the ends: 149 mm
Crown curve: biquadratic curve equation (a); assigned crown value C=1
Hardness of guide roll (crown roll): 25

Winding Conditions
Contact pressure of guide roll: 50 N/m
Winding tension: 60 N/m
Winding speed: 80 m/minute The hardness of a film roll obtained by winding up 1,000 m of the polyvinyl alcohol film was measured under conditions of 25° C. and 55% RH according to JIS K 6301 in the same manner as in Example 1. The film roll had a Shore A hardness of 55.

The roll of the polyvinyl alcohol film was unwound, treated and uniaxially stretched 4.6 times in total in the same manner as in Example 1 to give a polarizing film. However, the obtained polarizing film was not good, since uniform dyeing and stretching could not be achieved like in Comparative Example 2.

The polyvinyl alcohol films and polarizing films obtained in the Examples and Comparative examples were evaluated according to the following methods. The results are shown in Table 1.

Presence of Wrinkles

The polyvinyl alcohol films wound up 1,000 m was visually observed with respect to presence of wrinkles and evaluated according to the following criteria.
○: Formation of wrinkles is not observed.
X: Formation of wrinkles is observed.

Uneven Dyeing

The polarizing films were visually observed with respect to uneven dyeing and evaluated according to the following criteria.
○: Uneven dyeing is not observed.
X: Uneven dyeing is observed.

Polarizing Properties

The simplex percent transmission and degree of polarization of the polarizing films were measured by a spectrocolorimeter (model Σ90 made by Nippon Denshoku Kogyo Kabushiki Kaisha) at five points in the transverse direction and the respective average values were obtained.

TABLE 1

|  | Ex. 1 | Ex. 2 | Ex. 3 | Ex. 4 | Ex. 5 | Com. Ex. 1 | Com. Ex. 2 | Com. Ex. 3 |
|---|---|---|---|---|---|---|---|---|
| Polyvinyl alcohol film |  |  |  |  |  |  |  |  |
| Presence or absence of wrinkles | ○ | ○ | ○ | ○ | ○ | X | X | X |
| Uneven dyeing | ○ | ○ | ○ | ○ | ○ | X | X | X |
| Polarizing property |  |  |  |  |  |  |  |  |
| Transmission (%) | 42.8 | 42.7 | 42.7 | 42.8 | 42.7 | 42.6 | 42.4 | 42.6 |
| Degree of polarization (%) | 99.2 | 99.1 | 99.0 | 99.2 | 99.0 | 97.6 | 96.8 | 97.6 |

As shown in Table 1, the polyvinyl alcohol films obtained in the examples were good in winding state, so polarizing films free of uneven dyeing and having excellent optical properties were obtained therefrom without generating wrinkles in the steps of unwinding, dyeing and stretching.

In contrast, the polyvinyl alcohol films obtained in the comparative examples were not good in winding state and wrinkles generated at the time of unwinding, so uniform dyeing and stretching were not achieved to result in occurrence of uneven dyeing and the obtained polarizing films had lower optical properties.

As explained above, in the present invention, a polyvinyl alcohol film formed from a solution of a polyvinyl alcohol resin is wound up around a cylindrical core so as to provide a film roll having a surface hardness of 60 to 95 in terms of Shore A hardness measured at 25° C. and 55% RH according to JIS K 6301. As a result, no wrinkle is formed in the wound film and no blocking of the film occurs, so the appearance is good and a polyvinyl alcohol film which is homogeneous as a whole can be obtained.

Therefore, a polarizing film prepared from such a polyvinyl alcohol film has an excellent polarizing property, since uneven stretching does not occur in the stretching step in the production of polarizing films.

Further, when the polyvinyl alcohol film to be wound up has a water content of 0.5 to 7% by weight, problems resulting from blocking of the film, especially breaking of film at the time of winding up at a high speed, do not arise and also the film can be slit into ribbons without causing cracking at the edge portions of the ribbons.

Further, it is easier to control the surface hardness of the wound up film within the desired range without generating wrinkles if a guide roll is disposed in the vicinity of a cylindrical core for winding up the film around it and the film is wound up around the core by passing the film between the core and the guide roll in the state that the space between the core and the guide roll is maintained during the winding operation or in the state that the guide roll is in contact with the core through the running film.

What is claimed is:

1. A process for preparing a polyvinyl alcohol film, comprising the steps of:
    forming a polyvinyl alcohol film of 30 to 90 μm thickness from a solution of a polyvinyl alcohol resin, and
    rolling up said film around a cylindrical core made of a metallic material to form a film roll,
    wherein the surface hardness of the film roll is set to a Shore A hardness of 60 to 95,
    wherein said hardness is measured according to JIS K 6301 under conditions of 25° C. and 55% RH, and total thickness of the film on the core is no less than that of a 1,000 m of said polyvinyl alcohol film wound around the cylindrical core, and
    further wherein a guide roll is disposed in the vicinity of said cylindrical core and said film is rolled up around said cylindrical core by passing said film between said core and said guide roll in the state that a space between said core and said guide roll is maintained during the rolling up operation or in the state that said guide roll is in contact with said cylindrical core through the running film.

2. The process of claim 1, wherein said polyvinyl alcohol film has a water content of 0.5 to 7% by weight.

3. The process of claim 1, wherein said guide roll is a crown roll.

* * * * *

UNITED STATES PATENT AND TRADEMARK OFFICE
CERTIFICATE OF CORRECTION

PATENT NO. : 7,517,478 B2  Page 1 of 1
APPLICATION NO. : 10/731524
DATED : April 14, 2009
INVENTOR(S) : Kenji Hasegawa and Toshiyuki Edazawa It is certified that error appears in the above-identified patent and that said Letters Patent is hereby corrected as shown below:

In column 7, line 58, "a" should be --α--

In column 8, line 28, "a" should be --α--

In column 8, line 30, "rm" should --m--

In column 8, line 66, "rm" should be --m--

In column 9, line 34, "rm" should be --m--

Signed and Sealed this

Second Day of June, 2009

JOHN DOLL
*Acting Director of the United States Patent and Trademark Office*